United States Patent
Harmand et al.

(10) Patent No.: US 6,382,883 B1
(45) Date of Patent: May 7, 2002

(54) METHOD FOR LAPPING VALVE SEATS USING A SINGLE POINT CUTTING TOOL

(75) Inventors: Brice Harmand, San Diego, CA (US); Pierre Harmand, Annecy (FR)

(73) Assignee: Harmand Family Limited Partnership, San Diego, CA (US)

(*) Notice: Subject to any disclaimer, the term of this patent is extended or adjusted under 35 U.S.C. 154(b) by 0 days.

(21) Appl. No.: 09/521,333

(22) Filed: Mar. 9, 2000

Related U.S. Application Data (63) Continuation-in-part of application No. 09/153,766, filed on Sep. 15, 1998, now Pat. No. 6,086,293.
(60) Provisional application No. 60/081,481, filed on Apr. 13, 1998.

(51) Int. Cl.$^7$ .............................................. B23B 35/00
(52) U.S. Cl. ............................ 408/1 R; 408/3; 408/82; 408/83.5; 29/888.44; 29/890.12
(58) Field of Search ............................. 408/1 R, 3, 82, 408/83.5; 29/888.44, 890.122

(56) References Cited

U.S. PATENT DOCUMENTS

| | | | |
|---|---|---|---|
| 897,041 A | | 8/1908 | Weller |
| 2,660,463 A | | 11/1953 | Briney, Jr. |
| 2,693,965 A | | 11/1954 | Briney, Jr. |
| 2,875,390 A | * | 2/1959 | Tripp ........................... 318/39 |
| 2,901,927 A | * | 9/1959 | Morgan ......................... 408/3 |
| 3,002,404 A | * | 10/1961 | Estabrook ................... 173/152 |
| 3,109,329 A | * | 11/1963 | Knosp et al. .................. 408/3 |
| 3,125,796 A | * | 3/1964 | Brainard ....................... 408/3 |
| 3,259,957 A | * | 7/1966 | Stobbe .......................... 408/3 |
| 3,273,182 A | * | 9/1966 | McDonald ..................... 408/3 |
| 3,311,003 A | | 3/1967 | Daugherty |
| 3,548,172 A | * | 12/1970 | Centner et al. ............. 318/561 |

(List continued on next page.)

FOREIGN PATENT DOCUMENTS

| | | |
|---|---|---|
| DE | 825 783 C | 12/1951 |
| DE | 43 22 435 A1 | 1/1995 |
| EP | 0 300 959 A1 | 1/1989 |
| WO | WO 92/04152 | 3/1992 |

OTHER PUBLICATIONS

NAREX Automatic Boring and Facing Heads, NAREX 1998 Catalog, p. 2102.

OMRON, Laser Displacement Sensor, Z4M–WR, pp. 37–39.

*Primary Examiner*—S. Thomas Hughes
*Assistant Examiner*—Essama Omgba
(74) *Attorney, Agent, or Firm*—Eleanor M. Musick; Kilpatrick Stockton LLP

(57) ABSTRACT

The cutting tool for machining valve seats comprises a driving system, a spindle assembly, and a system controller. The driving system provides rotational movement and vertical movement for the spindle assembly which is controlled by the system controller. The spindle assembly further comprises a spherical sheath providing capability to align a spindle to any valve seat orientation, the spindle for rotating a universal cutting blade, a machining head attachable to the spindle, a tool holder carriage for holding the universal cutting blade, and a pinion feed driving assembly or set of connecting rods for controlling the cutting radius of the universal cutting blade. The pinion feed driving assembly is driven by a servo motor which moves the spindle vertically and independent from the vertical movement of the spindle assembly and the rotational movement of the spindle. The system controller includes memory and programming for controlling the operation of the universal cutting blade. An operator can input the parameters that define the geometry of the valve seat profile. These parameters are used by the system controller to determine the rotational speed, the vertical feed of the machine spindle, and the inward or outward feed of the universal cutting tool.

22 Claims, 8 Drawing Sheets

U.S. PATENT DOCUMENTS

| | | | |
|---|---|---|---|
| 3,559,256 A | * | 2/1971 | Lemelson .................... 29/33 P |
| 3,605,909 A | * | 9/1971 | Lemelson ....................... 173/3 |
| 3,623,216 A | * | 11/1971 | Aihara et al. ................... 483/11 |
| 3,685,022 A | * | 8/1972 | Raynes ....................... 700/179 |
| 3,728,940 A | | 4/1973 | Peterson |
| 3,730,636 A | | 5/1973 | Mizoguchi |
| 4,147,462 A | | 4/1979 | Appleby et al. |
| 4,386,532 A | | 6/1983 | Benjamin |
| 4,400,118 A | * | 8/1983 | Yamakage et al. ............. 408/3 |
| 4,545,706 A | | 10/1985 | Hiroyasu et al. |
| 4,555,205 A | | 11/1985 | Hiroyasu et al. |
| 4,611,958 A | | 9/1986 | Vasilchenko |
| 4,624,607 A | * | 11/1986 | Kato et al. ................... 408/1 R |
| 4,630,977 A | | 12/1986 | Theofanous |
| 4,643,623 A | | 2/1987 | Kondo et al. |
| 4,678,379 A | | 7/1987 | Sunday |
| 4,716,657 A | | 1/1988 | Collingwood |
| 4,753,556 A | | 6/1988 | Solko |
| 4,778,313 A | * | 10/1988 | Lehmkuhl ................... 409/127 |
| 4,789,280 A | | 12/1988 | Dobat et al. |
| 4,792,265 A | | 12/1988 | Rottler et al. |
| 4,836,719 A | | 6/1989 | Field |
| 4,842,452 A | | 6/1989 | Strait |
| 4,872,789 A | | 10/1989 | Field |
| 4,913,601 A | | 4/1990 | Tenand et al. |
| 4,966,460 A | | 10/1990 | Kahley |
| 5,001,871 A | | 3/1991 | Harmand |
| 5,017,062 A | | 5/1991 | Leroux et al. |
| 5,044,841 A | | 9/1991 | Biera et al. |
| 5,125,299 A | | 6/1992 | Strait |
| 5,302,057 A | | 4/1994 | Siegfried |
| 5,399,058 A | | 3/1995 | Harmand |
| 5,439,329 A | | 8/1995 | Marron |
| 5,445,478 A | | 8/1995 | Ordogh et al. |
| 5,533,847 A | | 7/1996 | Basteck |
| 5,613,809 A | | 3/1997 | Harmand et al. |
| 5,620,284 A | | 4/1997 | Ueda et al. |
| 5,725,335 A | | 3/1998 | Harmand et al. |
| 5,769,576 A | | 6/1998 | Gerard et al. |
| 5,829,928 A | * | 11/1998 | Harmand et al. .......... 408/83.5 |
| 6,029,098 A | * | 2/2000 | Serizawa et al. ........... 700/188 |
| 6,086,293 A | * | 7/2000 | Harmand et al. .......... 408/83.5 |
| 6,178,637 B1 | * | 1/2001 | Herold et al. .......... 29/890.122 |

* cited by examiner

| | |
|---|---|
| STEP 1 | SECURE CYLINDER HEAD AND ALIGN VALVE SEAT WITH FIXED PILOT |
| STEP 2 | INPUT PARAMETERS TO SYSTEM CONTROLLER AND DETERMINE VERTICAL FEED RATE NUMBER OF ROTATIONS, AND LENGTH OF VERTICAL DISPLACEMENT USING EQUATIONS 6, 9 AND 13 |
| STEP 3 | ADJUST VERTICAL FEED RATE AND ROTATIONAL SPEED THROUGH SYSTEM CONTROLLER TO MACHINE THE DESIRED PROFILE |
| STEP 4 | REPOSITION THE CUTTING BLADE BACK TO ITS ORIGINAL POSITION |

METHOD FOR LAPPING VALVE SEATS USING A SINGLE POINT CUTTING TOOL

RELATED APPLICATIONS

This application is a Continuation-In-Part of U.S. application Ser. No. 09/153,766, of Brice Harmand et al., filed Sep. 15, 1998, now issued as U.S. Pat. No. 6,086,293, which claims the benefit of priority under 35 U.S.C. §119(e) to U.S. provisional application Ser. No. 60/081,481 or Brice Harmand et al., filed Apr. 13, 1998.

BACKGROUND OF THE INVENTION

Cylinders of internal combustion engines must be sealed airtight when the valves are closed to ensure efficient fuel consumption and transfer of power. Cylinders having perfectly matched valve heads and valve seats produce an optimal seal. Since contact surfaces of the valves and valve seats are subject to wear and other degrading factors that effect the contact surface textures, these surfaces must be modified to re-establish the high quality seal.

It is well known among vehicle mechanics that valve seats can be machined to remove the outer surface of the seat to expose a smooth and uniform contact surface by a technique commonly referred to as "lapping". This lapping technique is accomplished by removing the cylinder head from the engine and machining the valve seats with a cutting blade. Typically, a valve seat has a profile with three different angles: a throat angle, a valve seat angle, and a top angle. Thus, a "three-angle" cutting blade or bit is used to machine a valve seat wherein each angle of the three-angle cutting blade corresponds to one of the valve seat angles to be machined. Three-angle cutting blades vary in size and shape depending on the type of cylinder head valve seat being machined. These three-angle cutting blades are currently used by valve seat and guide manufacturers.

A disadvantage of the lapping technique is the risk of damage to the surface finish from vibrations, chattering, or undulations generated from flexion of the cutting bits. This problem develops because certain large-diameter cylinder head valve seat shapes require a three-angle cutting blade with a long cutting edge/surface. Cutting efforts with this long cutting edge/surface create flexions at the level of the spindle of the cutting machine or on the cylinder head, especially when dealing with valve seat material that is difficult to machine. These flexions generate vibrations, chattering, or undulations which, in turn, damage the surface finish of the valve seat resulting in a machined valve seat that is not acceptable by Original Equipment Manufacturer (OEM) standards.

Another disadvantage of the lapping technique is a de-centering phenomena. As stated above, cutting efforts with a long cutting edge/surface create flexions. These flexions create an unbalanced radial cutting effort which de-centers the three-angle cutting blade.

Still another disadvantage of the lapping technique is the large number of three-angle cutting blades needed to machine different types of valve seats. Each type of engine has a different valve seat profile. Thus, one or more unique three-angle cutting blades may be needed for each type of engine.

In view of the aforementioned inadequacies of the prior art, the need exists for a cutting tool and a method to machine valve seats that substantially reduces flexions during machining and uses a universal cutting blade.

SUMMARY OF THE INVENTION

It is an advantage of the present invention to provide one universal cutting bit and bit holder having the ability to precisely machine an unlimited number of valve seat shapes concave, convex, and vertical bores.

It is also an advantage of the present invention to substantially reduce flexion of the cutting bit during valve seat machining.

It is another advantage of the present invention to eliminate de-centering phenomena due to unbalanced radial efforts from flexion.

Yet another advantage of the present invention is to eliminate vibrations, chattering, and undulations to provide improved roundness in a valve seat.

Still another advantage of the present invention is to provide concentric machining for multiple contours within a single valve seat.

In an exemplary embodiment, the present invention is a machining head of a machining apparatus comprising a spindle, a carriage head, a carriage head holder, a pinion feed driving assembly, and a universal cutting blade. A fixed pilot is attached to the bottom of the carriage head along the z-axis of a machine spindle to provide a means for centering the machining head in a valve guide of a cylinder head. The carriage head holder attaches to an extension of the machine spindle so that when the machine spindle is rotated, the machining head rotates. The carriage head is attached to the carriage head holder at an inclined angle relative to the bottom surface of the carriage head. The pinion feed driving assembly provides control of the inward and outward movement of the carriage head. The universal cutting blade is mounted on the carriage head through one of a plurality of mounting holes. The machining head can be utilized with virtually any conventional valve seat machining system, but is preferably used with the systems disclosed in U.S. Pat. No. 5,613,809, 5725,335, and 5,829,928 of Harmand, et al. (hereinafter the '809, '335, and '928 patent, respectively) which are incorporated herein by reference.

The machining apparatus of the preferred embodiment comprises a driving system, a machining head as described above, a pilot, a depth gauge, and a system controller. The driving system further comprises a machining sphere, a machine spindle, a spindle sheath, a drive motor, and a stepper motor. The spindle sheath is disposed within and supported by the machine sphere. The spindle sheath is fixed within the x- and y-axis, but can move along the z-axis by the stepper motor. The stepper motor is electrically connected and controlled by the system controller. The machine spindle is disposed within the spindle sheath and rotates around its z-axis through a drive motor. The drive motor rotating the machine spindle is electrically connected to and controlled by the system controller. The depth gauge is disposed on the spindle sheath by a fixed arm and is electrically connected to the system controller. The depth gauge measures the distance between a top surface of a cylinder head and the cutting blade.

The system controller includes a memory which contains software for controlling the operation of the cutting tool. This system controller includes a user interface at which an operator can input the parameters that define the geometry of a valve seat profile. These parameters are used by the system controller to determine the vertical feed rate of the machine spindle, the length of the vertical displacement of the spindle to machine the segment, the inward/outward displacement of the carriage head, and the number of rotations needed to machine a segment of the valve seat profile. The system controller uses a look-up table, stored externally or within internal memory, and the input information is used to determine the vertical feed rate of the machine spindle, the length of the vertical displacement of the spindle to machine the segment, and the number of rotations needed to machine a segment of the valve seat profile. The operator simply needs to center the spindle, activate the system after the initial input of information for a given cylinder head and valve seat profile, and re-center on each subsequent valve seat before activation.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which.

DETAILED DESCRIPTION OF THE PREFERRED EMBODIMENT

The cutting tool for machining valve seats comprises a driving system with a z-axis adjustable spindle, a depth gauge, a pilot, a machining head, and a system controller. The method for machining a valve seat having any taper angle by utilizing a universal cutting blade can be described by simultaneously varying the height and cutting radius of the cutting tool. Cutting radius is defined as the distance from the cutting blade to the z-axis of the spindle. Thus, the invention can machine an unlimited number of different taper angles within a single valve seat profile by continuously varying both the z-axis of the spindle and the cutting radius of the cutting tool. Specifically, a valve seat taper angle can be described by varying only the z-axis feed rate of the spindle when the spindle rotation varies the cutting radius of the cutting tool through a gearing system. Alternatively, a valve seat taper angle can be machined by varying only the rotational speed of the spindle while the z-axis feed rate of the spindle remains constant. Another method of machining a valve seat taper angle is to utilize a z-axis feed rate of the cutting tool, a spindle rotation to rotate the cutting tool, and a means to vary the cutting radius that is independent of spindle rotation.

In a first embodiment of the invention, a machining head is attached to a spindle and rotated by a driving system. The machining head further comprises a carriage head holder, a pinion feed driving assembly, a fixed angle carriage head, and a universal cutting blade. A pilot is attached to the bottom surface of the machining head along the z-axis of the spindle. The carriage head is disposed at a fixed angle to the carriage head holder. The cutting radius of the carriage head varies through cooperation with the z-axis adjustable spindle and a gearing system. A universal cutting blade with one edge is disposed on one of a plurality of mountings on the carriage head.

A depth gauge is disposed on the driving system to aid the z-axis spindle feed rate adjustment by determining the height of the cutting blade relative to the valve seat. The z-axis spindle feed rate adjustment can be accomplished by manual means or control means well-known to one of ordinary skill in the art such as a computer, a logic gate array, or a dedicated microprocessor.

Figure 1:
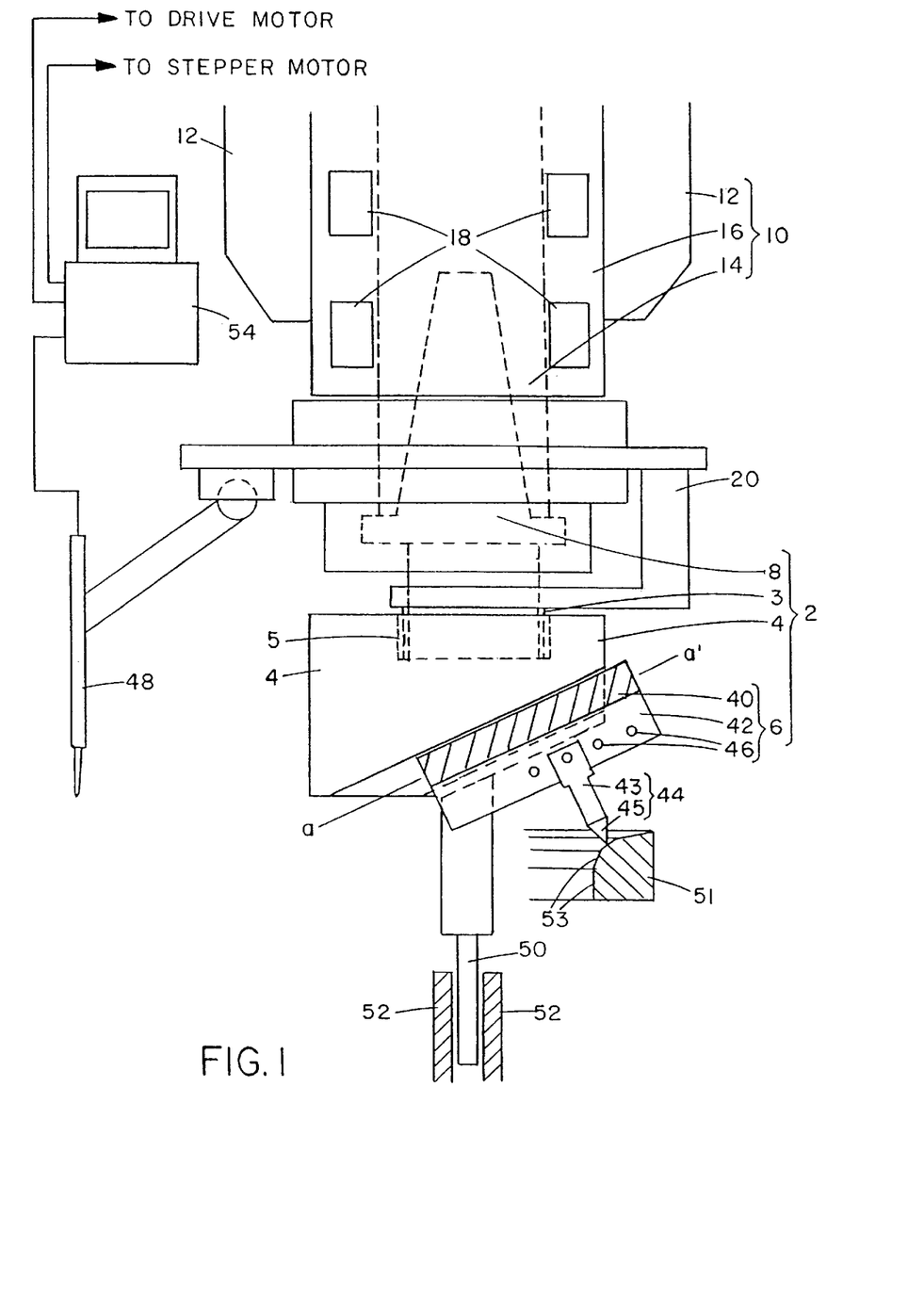
FIG. 1 is a diagrammatic front view of the cutting tool of a first embodiment.

In a first embodiment of the invention, as illustrated in FIG. 1, a driving system 10 comprises a drive motor (not shown), a transmission linkage (not shown), a stepper motor (not shown), a machine sphere 12, a machine spindle 14, and a spindle sheath 16 having an upper end and a lower end. The upper end of spindle sheath 16 is disposed within machine sphere 12 which provides support for spindle sheath 16. Alternatively, spindle sheath 16 can be supported by any conventional means known in the art such as a pantograph or multi-jointed arms. Spindle sheath 16 is mounted within machine sphere 12 which provides angular adjustment of spindle sheath 16. The framework (not shown), within which machine sphere 12 is supported, provides small x-y adjustment. Spindle sheath 16 can move along the z-axis by any conventional translation means such as a stepper motor. The stepper motor is electrically connected to a system controller 54 which controls the stepper motor. Alternatively, spindle sheath 16 can be translated manually, or by other known mechanical means along the z-axis. Machine spindle 14 has a distal end and is disposed within spindle sheath 16. Machine spindle 14 has an inside wall forming a cavity near its distal end adapted for connection to machining head 2. A plurality of spindle bearings 18 allows machine spindle 14 to rotate around its z-axis. Machine spindle 14 is rotated by a drive motor through any conventional means such as transmission linkage, direct connection, or universal joint linkage. The machine spindle 14 of a preferred embodiment is rotated by a drive motor through a transmission linkage. The drive motor, which rotates machine spindle 14, is electrically connected to system controller 54 which controls the drive motor.

Figure 2:
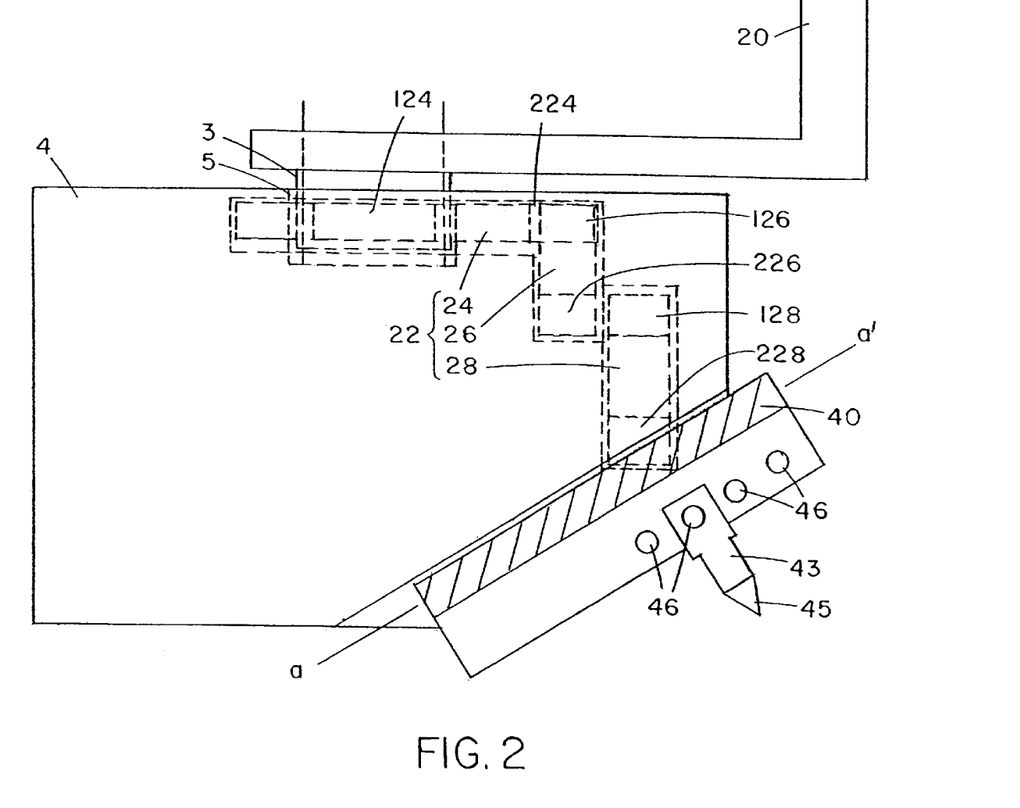
FIG. 2 is a diagrammatic front view of the machining head of the cutting tool a first embodiment.

Referring to FIGS. 1 and 2, machining head 2 comprises a taper adapter 8, a fixed sleeve 3, a carriage head holder 4, a pinion feed driving assembly 22, a carriage head 6, and a universal cutting blade 44. Taper adapter 8 has an upper portion, a middle portion, and a lower portion. The upper portion of taper adapter 8 is adapted to cooperate with the cavity near the distal end of machine spindle 14 so that taper adapter 8 is rotated by machine spindle 14. The lower portion of taper adapter 8 is attached to carriage head holder 4 so that when machine spindle 14 is rotated, carriage head holder 4 also rotates.

Carriage head holder 4 has a top portion having a cavity 5. Cavity 5 further includes a ball bearing or needle bearing 38 to receive fixed sleeve 3 and machine spindle 14. Machine spindle 14 extends through fixed sleeve 3 to attach to the bottom of cavity 5 for transmitting the rotation movement of the spindle 14 to the machining head 2. Fixed sleeve 3 does not rotate or move relative to spindle sheath 16.

Fixed sleeve 3 is attached to spindle sheath 16 through means well-known to one of ordinary skill in the art such as a support arm 20. Support arm 20 has a vertical portion and a horizontal portion. The vertical portion of support arm 20 has a top end and a bottom end wherein the top end is attached to the lower end of spindle sheath 16. The horizontal portion of support arm 20 has a proximal end and a distal end wherein the proximal end is attached to the bottom end of the vertical portion of support arm 20. The distal end of support arm 20 is attached to fixed sleeve 3.

Figure 3:
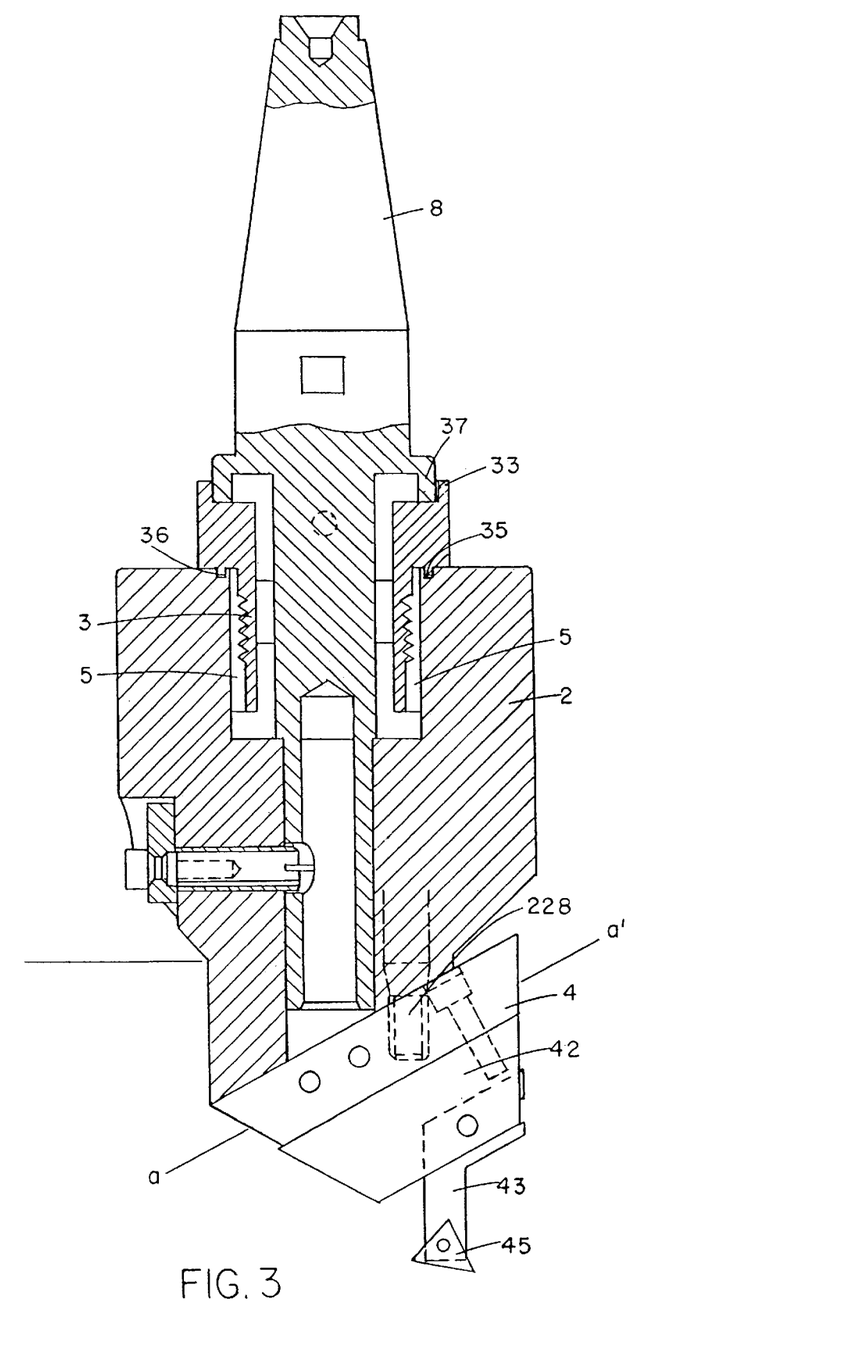
FIG. 3 is a front view, partially cut away, of the machining head and spindle a first embodiment.
Figure 4:
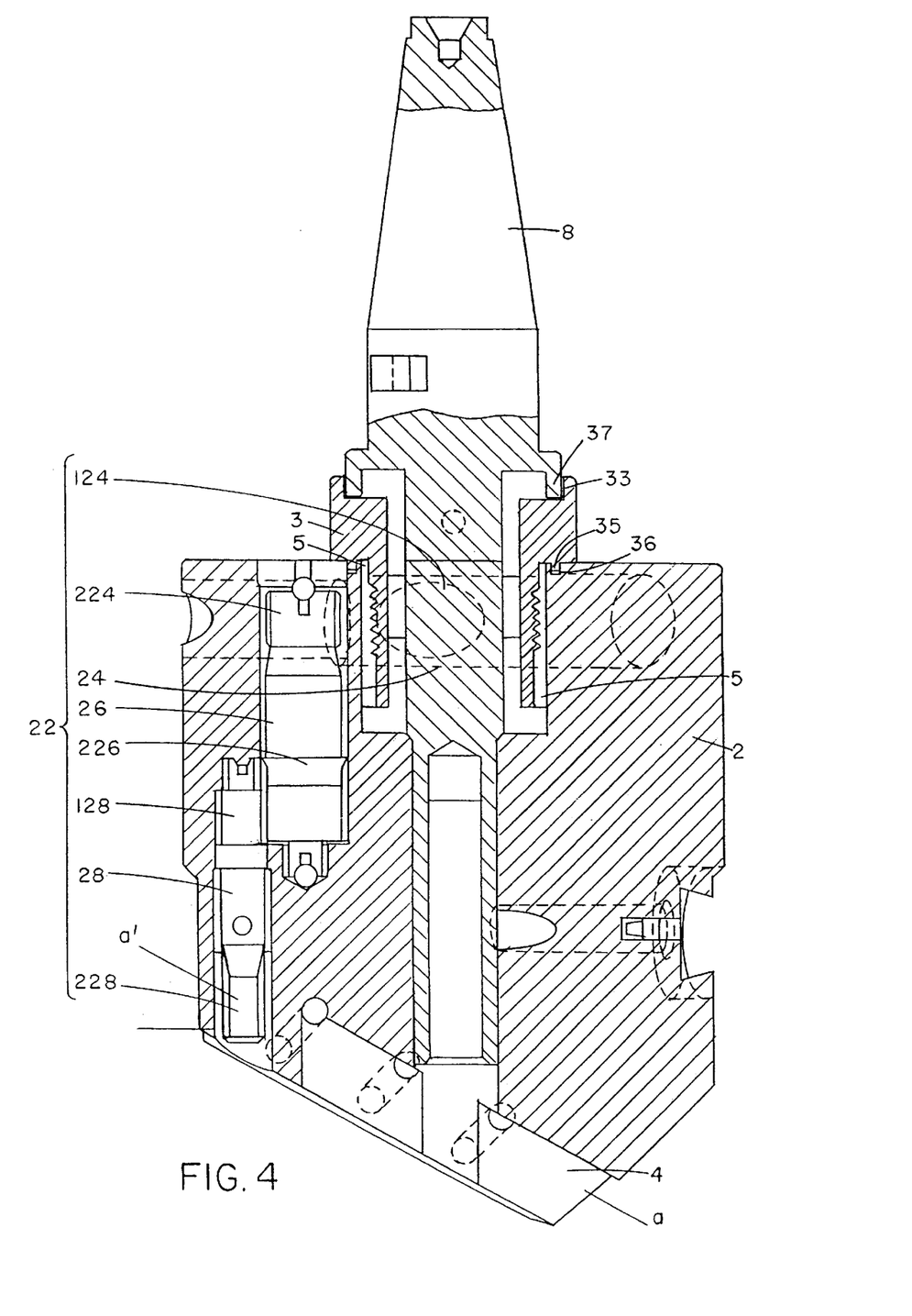
FIG. 4 is a side view, partially cut away, of the machining head, showing the pinion drive gearing system a first embodiment.

Referring to FIG. 3 and FIG. 4, taper adapter 8 is adapted to rotate freely within fixed sleeve 3. Fixed sleeve 3 has a top portion and a bottom portion. The top portion of fixed sleeve 3 has an upward annular flange 33 extending upward, and a downward annular flange 35 extending downward. The middle portion of taper adapter 8 has an annular flange 37 extending slightly downward. Upward annular flange 33 has a slightly larger diameter than annular flange 37 and interfits with annular flange 37 to help prevent taper adapter 8 from vibrating or moving within the x- and y-axis, and to prevent grease from coming out and outside dirt, e.g., metal shavings and dust, from penetrating directly into bearing 38. Downward annular flange 35 mates with an annular channel 36 on the top surface of carriage head holder 4 to help provide additional stability against vibration or movement within the x- and y-axis. Annular flange 35 and annular channel 36 also prevent grease from escaping and outside contaminants such as metal shavings and dust from penetrating directly into bearing 38. The lower portion of fixed sleeve 3 is threaded and disposed within cavity 5 formed on the top of carriage head holder 4. The thread on the bottom portion of fixed sleeve 3 is adapted to cooperate with a pinion feed driving assembly 22 as shown in FIG. 4.

Fixed pilot 50, as shown in FIG. 1, attaches to the bottom surface of carriage head holder 4 so that fixed pilot 50 is aligned along the z-axis of machine spindle 14. Fixed pilot 50 fits closely within a valve guide 52 of an engine cylinder head to aid in centering machining head 2. Selection of an appropriate pilot is within the level of skill in the art.

Figures 5, 6:
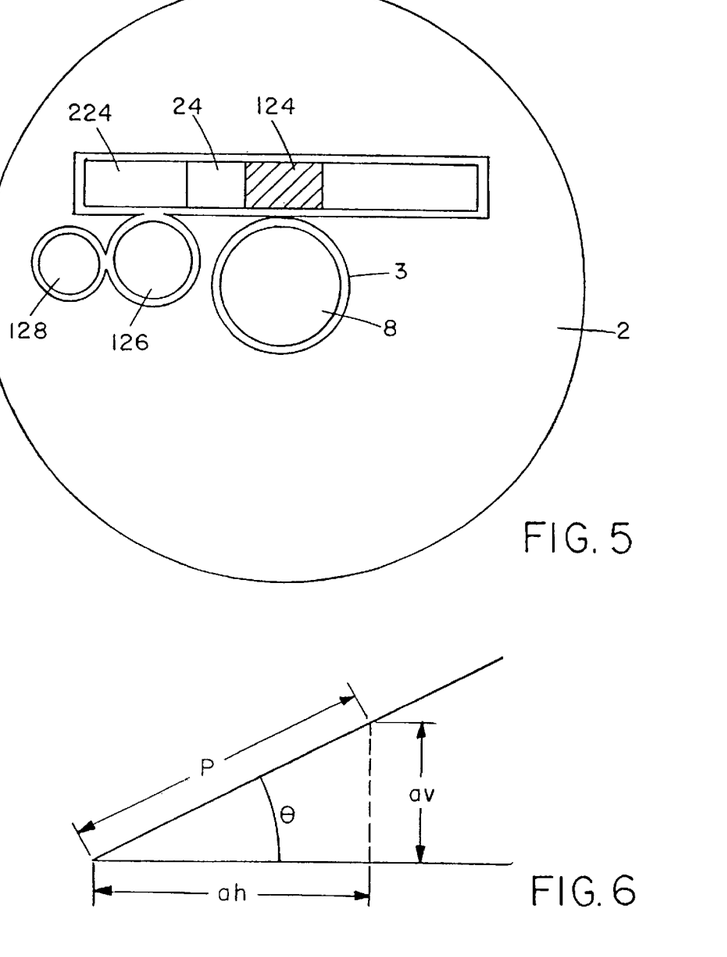
FIG. 5 is a diagrammatic top view, partially cut away, of the machining head, showing the pinion feed driving assembly a first embodiment.
FIG. 6 is a geometrical representation of the feed per revolution of the carriage head according to its inclination angle a first embodiment.

Referring to FIGS. 2 and 5, pinion feed driving assembly 22 comprises a geared horizontal member 24, a pinion arbor 26, and a geared vertical member 28. Carriage head holder 4 has interior walls forming three bores which are slightly larger than pinion feed driving assembly 22. These bores within carriage head holder 4 are adapted to support pinion feed driving assembly 22 and to allow the members of the pinion feed driving assembly 22 to rotate freely within the bores of carriage head holder 4.

Geared horizontal member 24 comprises a proximal gear 124 and a distal gear 224. Geared horizontal member 24 has a proximal end and a distal end. Proximal gear 124 is attached to the proximal end of geared horizontal member 24 and is adapted to cooperate with the thread on fixed sleeve 3 so that when machining head 2 is rotated, geared horizontal member 24 rotates. Distal gear 224 is attached to the distal end of geared horizontal member 24 and is adapted to cooperate with and rotate pinion arbor 26. Pinion arbor 26 comprises a first gear 126 and a second gear 226. Pinion arbor 26 has a top end and a bottom end. First gear 126 is attached to the top end of pinion arbor 26 and second gear 226 is attached to the bottom end of pinion arbor 26. First gear 126 is adapted to cooperate with distal gear 224. Second gear 226 is adapted to cooperate with geared vertical member 28. Geared vertical member 28 comprises a top gear 128 and a bottom gear 228. Top gear 128 is attached to geared vertical member 28 to the end closest to pinion arbor 26. Top gear 128 cooperates with second gear 226 so that when pinion arbor 26 is rotated, geared vertical member 28 rotates. Bottom gear 228 is attached to geared vertical member 28 to the end farthest to pinion arbor 26. Bottom gear 228 cooperates with carriage head 6 so that when geared vertical member 28 is rotated, carriage head 6 moves along line a–a'. A number of configurations for pinion feed driving assembly 22 are well known, and a person of ordinary skill in the art would recognize that alternative gear assemblies may be used to provide the desired movement.

As shown in FIGS. 1 and 2, carriage head 6 further comprises a toothed rack 40 and a cutting blade holder 42. Carriage head 6 is slidably attached to carriage head holder 4 at an inclined angle relative to the bottom surface of carriage head holder 4. Toothed rack 40 cooperates with geared vertical member 28 so that carriage head 6 is moved along line a–a' when geared vertical member 28 is rotated. The outward movement of carriage head 6 along line a–a' increases the cutting radius of carriage head 6. Cutting radius is defined as the radial distance from a cutting blade 44 to the z-axis of the machine spindle 14. Likewise, the inward movement of carriage head 6 along line a–a' decreases the cutting radius. Thus, the rotation of machine spindle 14 provides rotational movement for carriage head holder 4 and linear movement along line a–a' for carriage head 6 through pinion feed driving assembly 22. The movement of carriage head 6 along line a–a' can be accomplished through other conventional means known to one of ordinary skill in the art such as a belt and pulley configuration.

Cutting blade holder 42 provides means for mounting a cutting blade 44. A variety of mounting means are well-known in the art such as nut-bolt and screw-thread configurations. In the preferred embodiment, cutting blade holder 42 has a surface defining a plurality of mounting holes 46. Cutting blade 44 can be mounted to any one of the plurality of mounting holes 46 to provide larger scale adjustment of the cutting radius by varying the starting point of cutting tip 45.

Cutting blade 44 has a proximal end and a distal end. Cutting blade 44 comprises mounting surface 43 on the proximal end and cutting tip 45 on the distal end. Cutting tip 45 has one edge. Alternatively, cutting tip 45 can have a plurality of edges. Mounting surface 43 is disposed on cutting blade holder 42 through any one of the plurality of mounting holes 46.

As shown in FIG. 1, depth gauge 48 is disposed on the spindle sheath 16 by a moveable arm or by any conventional means known in the art such as clamps or solder. Depth gauge 48 can be a linear gauge which contacts the surface of the cylinder head for measuring the distance between a valve seat and cutting blade 44. Other means for measuring distance may be used, as are known in the art, including optical measurement techniques, e.g., lasers. Depth gauge 48 is electrically connected to a system controller 54 to provide feedback for control of feed rate and depth. Alternatively, depth gauge 48 can be connected to an output display.

System controller 54 includes memory and programming for controlling the operation of the cutting tool. System controller 54 can be any control means well-known to one of ordinary skill in the art such as a computer, a transputer, a logic gate array, or a dedicated microprocessor. Preferably, system controller 54 is a computer with a touch-screen display. Other operator interfaces may be used including keypads or smart card readers. An operator can input the parameters that define the geometry of the valve seat profile. System controller 54 uses these parameters to determine the vertical feed rate for machine spindle 14, the length of the vertical displacement of machine spindle 14 to machine the segment, and the number of rotations needed to machine a segment of the valve seat profile. With such information in memory, the operator intervention is minimal including centering machine spindle 14 and selecting the appropriate valve seat profile. For example in a typical machining process of the preferred embodiment, the operator enters the type of engine to be machined into system controller 54. The system controller 54 uses a look-up table stored externally or within internal memory and the input information to determine the number of rotations and the vertical feed speed of machine spindle 14 in order to bring the valve seats within OEM specifications or to meet other desired specifications. The operator simply needs activate the system after the initial input of the appropriate information for the subject cylinder head. The machine spindle 14 is automatically centered and re-centered on each subsequent valve seat before activation. The system controller can use either internal memory or external memory such as "smart card" or a memory card.

In an embodiment using a memory card, each memory card is dedicated to a single cylinder head, or family of cylinder heads such that, by inserting the memory card into a memory card reader, the specific parameters of a particular machining task is loaded into system controller 54. This ensures that the cutting tool operator, regardless of experience level or personal preferences, will machine the cylinder head according to the specifications stored on the memory card. Because of the ease of programming and reading the memory card, particular customers may wish to have their own dedicated memory card. For example, a memory card can be programmed for each family of cylinder heads of specific car manufactures to store the optimum machining characteristics for each.

In another embodiment, the memory card can also have dimensional specifications and/or set-up parameters selected and stored by the vehicle manufacturer in addition to the set-up parameters stored by the operator. The memory card of this embodiment ensures that machining is uniform from engine to engine of the same type in accordance with the manufacturer's specifications. In addition, the pre-programmed memory card can facilitate repairs where a repair shop services a large number of the same make and model of a given vehicle.

The memory card, commonly called a "smart card" or "token smart card" is available from different manufacturers worldwide. (See, e.g., Bright, *Smart Cards: Principles, Practice, Applications*, Holsted Press, 1988.) Such cards use either a programmable microchip or a magnetic strip on its back side to store up to 256 bytes of information. The memory card device is a commercially available card reader which is electronically interfaced to system controller 54. Thus, once the memory card is inserted into the card reader, the digital information which is stored on the card is retrieved by system controller 54 to automatically set up the machining of the cylinder head. As this method of storing information is common in other fields, the details of the particular method of encoding and decoding the digital information from the memory card is not discussed here.

The method for machining valve seats may be used for machining valve seats of virtually any shape using a universal cutting blade. The only limitation is that the radius of the valve seat must fit within minimum and maximum allowable positions of carriage head 6, as shown in FIG. 1. The method comprises coordinating the feed rate of the z-axis translation of machine spindle 14 with the cutting radius of carriage head 6. Although coordination may be accomplished manually, coordination through system controller 54 is preferred.

Figure 8:
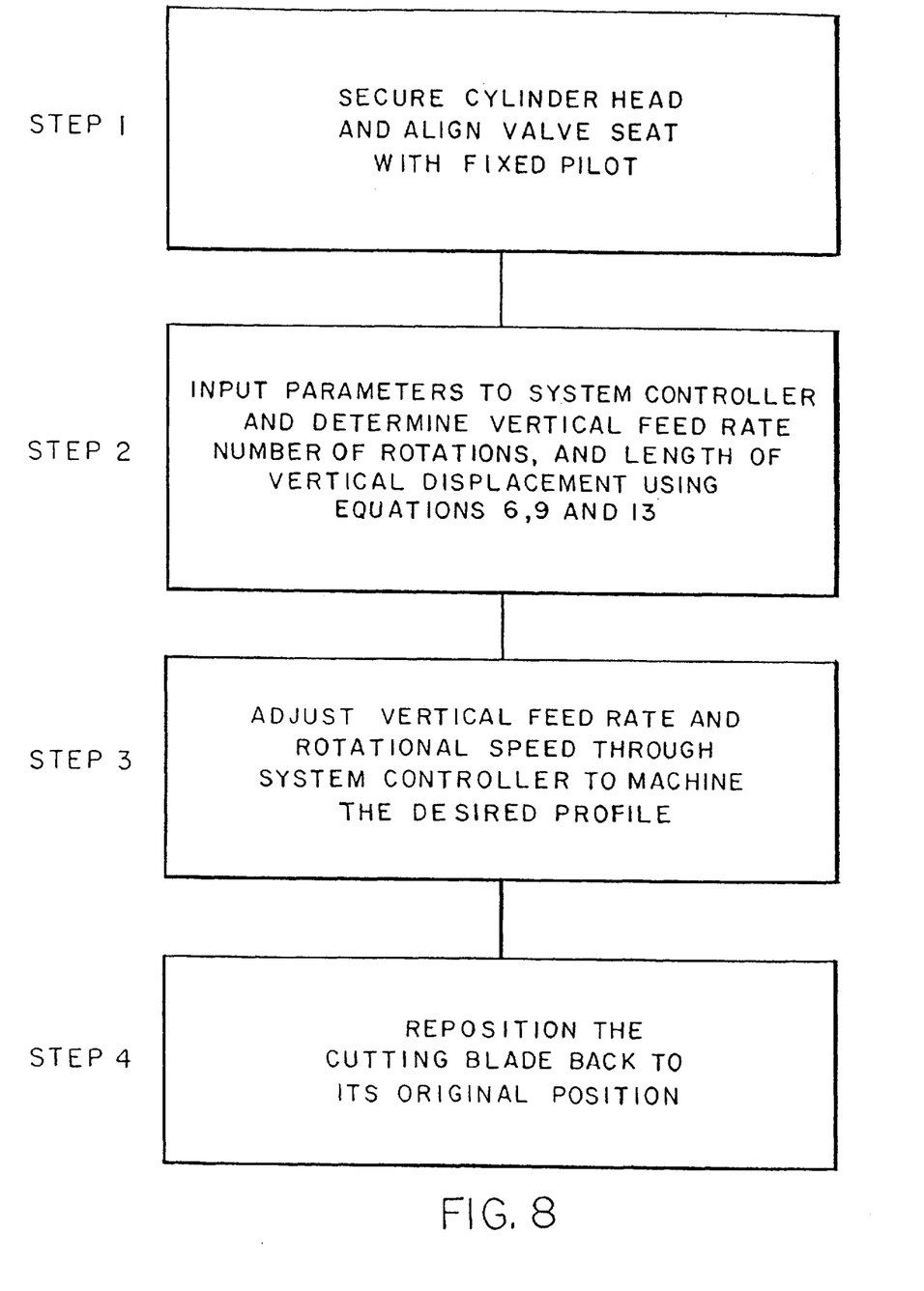
FIG. 8 is a block diagram showing the steps of the method for machining valve seats a first embodiment.

Referring to FIG. 8, the method for machining valve seats comprises four steps. First, a valve seat is centered using the fixed pilot of the cutting tool. Second, the vertical feed rate, the length of the vertical displacement of machine spindle 14 to machine the segment, and the number of rotations for each segment of the valve seat profile are calculated by system controller 54 from input parameters of the valve seat profile. Third, system controller 54 adjusts the vertical feed rate of machine spindle 14 to cut each segment according to the desired valve seat profile. Fourth, system controller 54 returns the cutting blade to its original position.

In the first step, a cylinder head valve seat is secured into position beneath machining head 2 through any conventional means known to one of ordinary skill in the art such as a stand with adjustable multi-direction clamps. The cylinder head is positioned so that valve guide 52 is aligned with both fixed pilot 50 and the z-axis of machine spindle 14. This alignment can be accomplished by a number of techniques known to one of ordinary skill in the art such as adjusting the position of the cylinder head or machining head 2.

In the second step, the parameters that define the geometry of the profile of the valve seat are input to system controller 54 by an operator. The parameters can be input directly using Cartesian coordinates (x,y) or polar coordinates (length, angle). Alternatively, the parameters can be retrieved from a pre-established database of valve seat profiles that are stored in internal memory such as a hard disk drive, or external memory such as a "smart card". Once the valve seat profile is input, system controller 54 decomposes the valve seat profile into a number of segments. The vertical feed speed and direction of machine spindle 14 is computed for each of these segments according to the number of rotations needed and the angle of the segment. The starting and finishing points are the length of the segment and the coordinates of the preceding segment. The programming of system controller 54 is derived from the configuration of the cutting tool, the input parameters, and trigonometry.

A formula to determine the vertical feed per revolution of machine spindle 14 for each segment can be calculated from the feed per revolution of the carriage according to its inclination angle, the angle of carriage with respect to the horizontal, and the angle of the segment. Referring to FIG. 6, where:

P=feed per revolution of the carriage according to its inclination angle;
ah=horizontal feed per revolution of the carriage;
av=vertical feed per revolution of the carriage; and
θ=angle of the carriage with respect to the horizontal.

The values for ah and av are calculated according to simple trigonometric functions for the base and height of a right triangle.

$$ah = P^* \cos\theta \quad (1)$$
$$av = P^* \sin\theta \quad (2)$$

Figure 7:
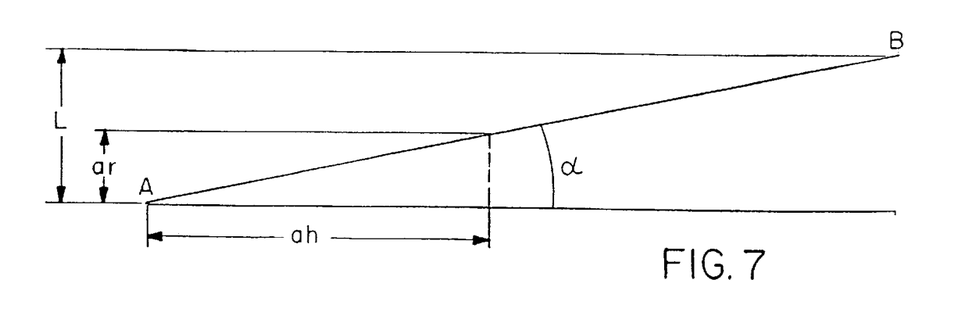
FIG. 7 is a geometrical representation of a segment length of a valve seat profile a first embodiment.

Referring to FIG. 7, where:
AB=segment length;
α=angle of the segment;
L=vertical projection of the segment; and
ar=resulting feed per revolution due to the feed rate of the carriage and to the vertical movement of machine spindle 14.

The value for ar is derived according to the simple trigonometric function:

$$ar = ah * \tan \alpha \quad (3)$$

Now, substituting for ah using equation (1):

$$ar = P * \cos \theta * \tan \alpha \quad (4)$$

The vertical feed per revolution of machine spindle 14, F, can be determined using ar and av. By definition:

$$ar = av + F \quad (5)$$

where,

F=vertical feed per revolution of machine spindle 14.
Now, rearranging Equation 5 and substituting for ar and av from Equations 4 and 2:

$$F = ar - av$$

$$F = P(\cos \theta * \tan \alpha - \sin \theta) \quad (6)$$

The number of rotations that machine spindle 14 must complete to machine the segment, N, and the length of the vertical displacement of machine spindle 14 to machine the segment, d, can be determined from AB, $\alpha$, and $\theta$.

N=number of rotations that machine spindle 14 must complete to machine the segment d=length of the vertical displacement of machine spindle 14 to machine the segment By definition:

$$L = ar * N \quad (7)$$

Using the trigonometric relationship:

$$L = AB * \sin \alpha \quad (8)$$

Substituting for ar using equation (4):

$$N = L/ar = (AB * \sin \alpha)/(P * \cos \theta * \tan \alpha)$$

Thus, $$N = (AB * \cos \alpha)/(P * \cos \theta) \quad (9)$$

By definition, $$d = F * N \quad (10)$$

Substituting for F and N using equation (6) and (10)

$$d = P(\cos \theta * \tan \alpha - \sin \theta) * (AB * \cos \alpha)/(P * \cos \theta) \quad (11)$$

Rearranging equation (12):

$$d = [AB/\cos \theta] * [\cos \alpha (\cos \theta * \tan \alpha - \sin \theta)] \quad (12)$$

Expanding equation (13):

$$d = [AB/\cos \theta] * [(\cos \alpha * \cos \theta * \sin \alpha / \cos \theta) - (\cos \alpha * \sin \theta)]$$

$$d = [AB/\cos \theta] * [\cos \theta * \sin \alpha - \cos \alpha * \sin \theta]$$

Substituting the trigonometric identity of $\sin(x-y) = \sin x * \cos y - \cos x * \sin y$:

$$d = [AB/\cos \theta] * \sin(\alpha - \theta) \quad (13)$$

Thus, given a segment length, AB, and the angle of the segment, $\alpha$, system controller 54 can calculate F (the vertical feed per revolution (vertical feed rate) of machine spindle 14, N (the number of rotations that machine spindle 14 must complete to machine the segment), and d (the length of the vertical displacement of machine spindle 14 to machine the segment).

In the third step shown in FIG. 8, system controller 54 uses the values calculated from the operator input parameters as shown in Equations 6, 9, and 13 to adjust cutting blade 44 to machine the desired profile. The operation of carriage head 6 along line a–a' of FIG. 1 relies on the rotation of machine spindle 14 through pinion feed driving assembly 22. The a–a' movement depends only upon the number of rotations machine spindle 14 goes through, as opposed to the speed of rotation or the movement of the z-axis spindle. The coordination of the movement of the z-axis and the cutting radius can machine any shape valve seat.

A number of methods can be used to accomplish valve seat machining. In a preferred method of the first embodiment the vertical feed rate of machine spindle 14 is adjusted for each segment while the rotational speed of machine spindle 14 is kept constant. In another embodiment, the vertical feed rate is constant and the rotational speed of machine spindle 14 varies. In another machining method, system controller 54 can vary both the vertical feed rate and the rotational speed of machine spindle 14 to machine the desired profile.

In a preferred embodiment of the third step, the combination of machine spindle 14, carriage head 6, depth gauge 48, and fixed pilot 50 works with system controller 54 to machine any desired pattern. An operator centers the valve seat with fixed pilot 50 which fits closely within the valve guide 52 of the engine cylinder head. System controller 54 uses the input parameters from the operator and inputs from depth gauge 48 to control vertical feed rate of machine spindle 14. Machine spindle 14 rotates carriage head 6 which rotates cutting blade 44. As machine spindle 14 is rotated, the cutting radius increases or decreases because carriage head 6 is moved outward or inward along line a–a'. This movement is caused by the combination of fixed sleeve 3 cooperating with pinion feed driving assembly 22 which cooperates with toothed rack 40.

Depth gauge 48 contacts the surface of the cylinder head and produces an electrical signal indicative of surface distance. This signal is provided to system controller 54, which may be a dedicated microprocessor or a main system computer with a touch screen display. The system controller 54 then provides a command to a vertical translation means, such as a stepper motor, to correctly go to the reference point used as the beginning point from which the desired profile is machined.

Figure 9:
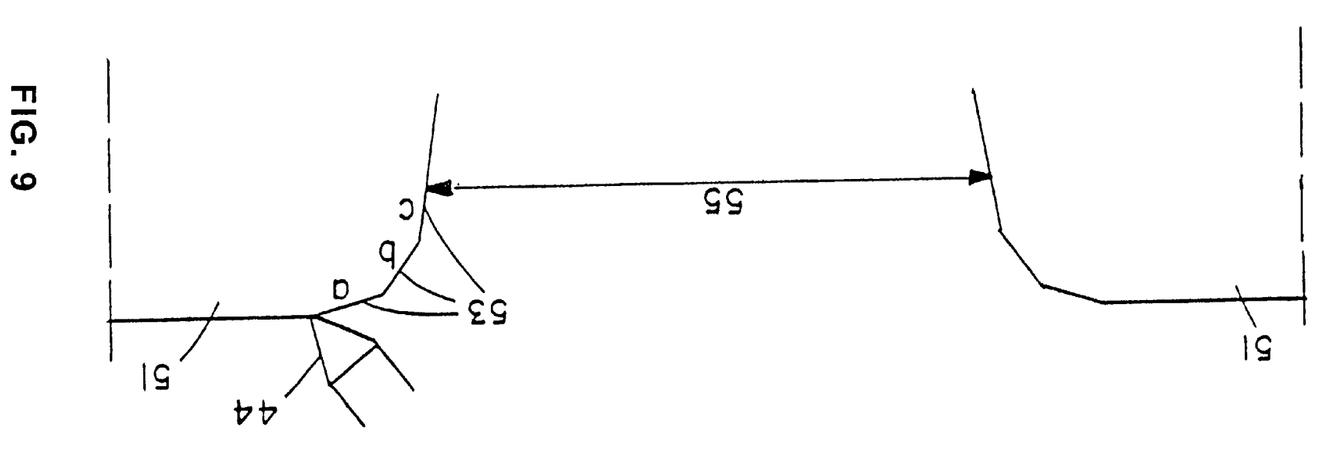
FIGS. 9 is a diagrammatic side view of a method for machining valve seats.

Referring to FIG. 9, the initial position of cutting blade 44 is the same for each valve seat 55 to be machined within cylinder head 51. In a preferred embodiment, the initial position of cutting blade 44 is the point radially closest to the radial center of the valve seat, and each valve seat is machined from its innermost radial point to its outermost radial point. To create the different radii or facets 53a,b,c of a three facet valve seat profile, the vertical feed rate is varied to move the cutting blade 44 at the desired facet angle according to the relationships provided in Equations 6, 9, and 13. The cutting blade 44 is shown positioned after completing the first radius or facet "c". This example is not intended to be a limitation on the invention and one of ordinary skill in the art would recognize alternative methods. For example, the initial position of cutting blade 44 may be at the outermost radial point of the valve seat while the carriage head cutting radius moves inward. Alternatively, the initial position of cutting blade 44 can be anywhere along the radius of the valve seat while system controller 54 first machines outwardly, then returns to the initial position to machine inwardly.

In a preferred embodiment the machining head 2 is also capable of machining curves. Each curve segment is decomposed into as many straight lines as necessary for a desired surface contour. Each straight line segment then corresponds to at least one rotation of the machining head for a circular interpolation.

In a preferred embodiment, following completion of a final radius, system controller 54, as shown in FIG. 1, moves cutting blade 44 back to its original position by translating the z-axis of machine spindle 14 to its original height. System controller 54 then returns carriage head 6 to its original cutting radius by rotating machine spindle 14 in reverse by the exact number of rotations used to machine the entire valve seat. In another embodiment that is not as efficient in the number of steps, carriage head 6 can be disengaged and the z-axis of machine spindle 14 raised to higher than the original height. Then, machine spindle 14 is rotated in reverse by the exact number of rotations used to machine the entire valve seat and machine spindle 14 is lowered back to its original height. The method of returning the cutting blade 44 back to its original position may be accomplished by various methods, and one of ordinary skill in the art would recognize alternative methods to accomplish the same result.

The present invention utilizes a single universal cutting blade for any shape valve seat. This aspect of the invention is significant because prior art systems must use a different cutting blade for each type of valve seat shape. It is common for a prior art system to require over one hundred different cutting blades to machine a large range of cylinder heads. The use of a single cutting blade saves time for machining different valve seats because the cutting blade does not have to be replaced each time a new valve seat shape is encountered. Also, the cost of obtaining many different types of cutting blades is reduced to the cost of a single universal cutting blade.

The system of the present invention further provides a smaller cutting blade. The overall cutting surface of the smaller cutting blade is smaller than a three-angle cutting blade because the smaller cutting blade has only one edge or angle. Because a smaller cutting blade has a smaller cutting surface, flexion during cylinder head valve seat machining is greatly reduced, and in turn, vibrations, chattering, and undulations are reduced. A smaller cutting blade also prevents a de-centering phenomena due to unbalanced radial efforts from flexion. Thus, the inventive system provides reliable and repeatable means for machining a valve seat of virtually any shape.

The method of machining a valve seat of a cylinder head 51 of the first embodiment as shown in FIG. 1 includes the steps of rotating the spindle 14 which is driven by the center of the spindle, feeding the tool holder carriage 6 outward or inward utilizing the rack and pinion feed driving assembly 22 as shown in FIG. 2, and vertically displacing the spindle 14 which is driven by a precision screw that is built into a spherical sheath and motor affixed on the top of the spindle 14. Since the spindle assembly 1 is driven from a fixed point on the spindle sheath 16 and by the rotation of the spindle 14, the feed movement of the carriage 6 along feed line a–a' cannot be disengaged form the rotation movement of the spindle 14. As shown in FIG. 9, this system provides a means for machining a variety of valve seat shapes 55 including concave and convex facets, wherein the facets 53*a,b,c* may be machined up to approximately eighty degrees with respect a vertical axis along the center of the spindle 14. The facet angle is limited depending upon the acceptable surface finish and the fixed feed rate per revolution of the carriage 6.

Figure 10:
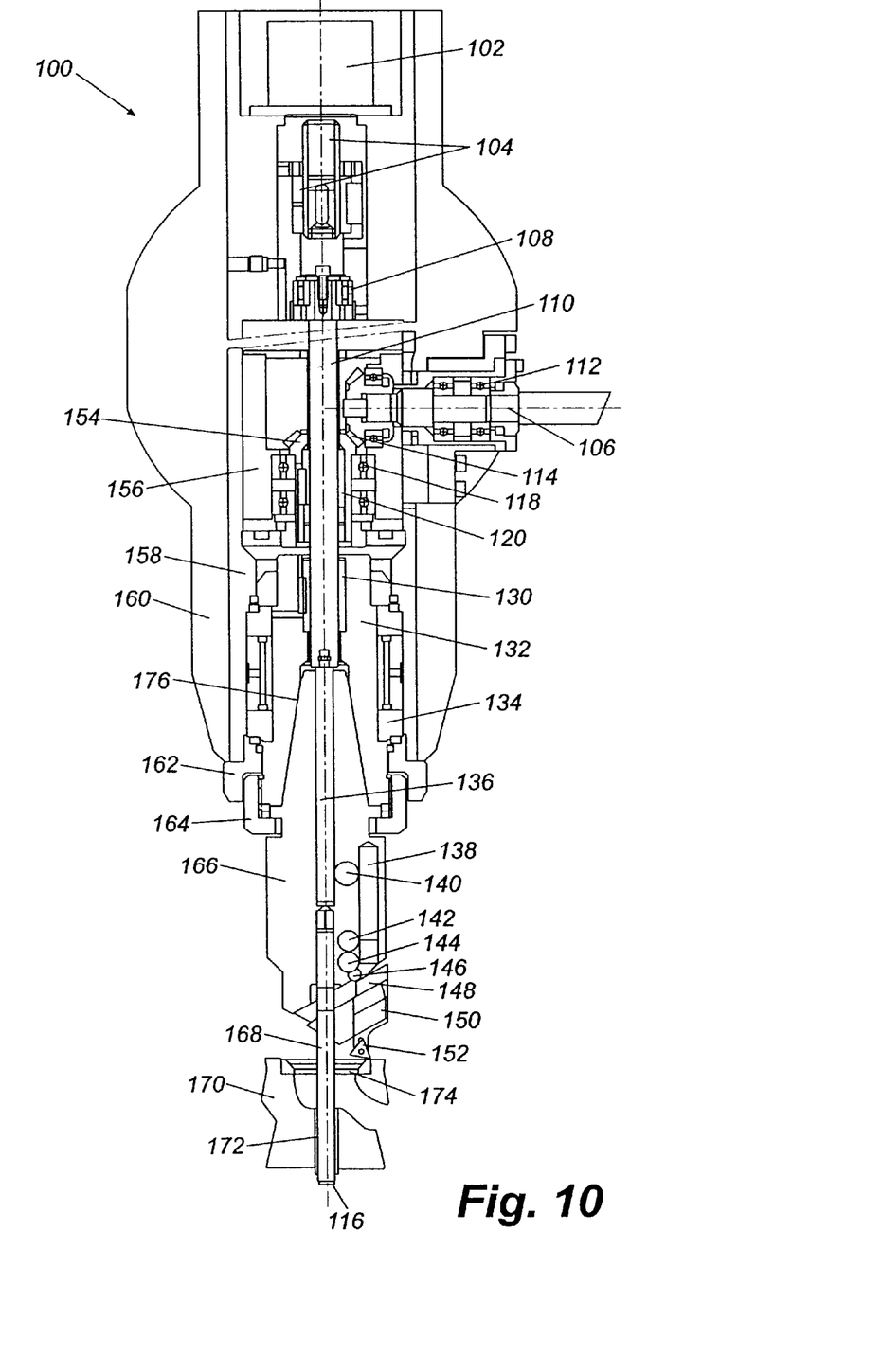
FIG. 10 is an illustration of a second embodiment of the present invention wherein the feed movement of the carriage can be disengaged from the spindle rotation.

FIG. 10 shows a second embodiment of the spindle assembly 100 of the present invention. The valve seat 174 is machined by a cutting tool 152 working on an independently controlled inwardly/outwardly moving tool holder carriage 150. The second embodiment machines the cylinder head 170 valve seat 174 by dissociating the feed of the carriage 150 with respect to the rotation of the spindle 132. In contrast to the first embodiment as shown in FIG. 1, the second embodiment provides unlimited machining possibilities including cylindrical bores that are coaxial with the axis of the spindle 132. In addition, spindle assembly 100 has a capability of machining inwardly and outwardly within the same machining cycle.

Referring to FIG. 10, the independent movement of the tool carriage 150 is accomplished using a separate driver from the mechanism which drives the rotation of the spindle 132. In a preferred second embodiment a stepper motor 102 is utilized to control the feed of the tool holder carriage 150. The stepper motor 102 drives a ball screw assembly 104 including a ball screw and a cooperating nut for translating the rotational movement of the stepper motor 102. The combination stepper motor 102 and ball screw assembly 104, attached to a proximal end of arbor 110, permits arbor 110 to move vertically along the machine head axis 116. The arbor 110 is attached to an axial control rack 136 at a distal end of the arbor 110. As the axial control rack 136 is raised or lowered by stepper motor 102 control, the vertical movement is translated through a first pinion 140 to the carriage feed control rack 138. Lead/drive pinions 142, 144, and 146 in turn, move the tool holder carriage 150 along axis a–a' as shown in the first embodiment of FIG. 1.

The arbor 110 for controlling the movement of the tool holder carriage 150 also drives the rotation of the tool holder spindle 132. The rotation of the arbor 110 is driven by drive motor (not shown) and transmission linking assembly 106. The transmission linking assembly 106 is connected to cone-shaped leading pinion 114. Support bearings 112 are fixed within spherical housing 160 and serve to stabilize the linkage section 106. Leading pinion 114 cooperates with a cone-shaped driven pinion 154 and a first and second arbor nut 120, 130 to rotate and drive tool holder spindle 132. Spindle support bearing sets 118 are contained within a spindle driving pinion set enclosure 156 formed within the spherical housing 160 to guide the driven pinion 154 and do not move with the spindle 132. Spindle bearing sets 134 are held in position by bearing lock nuts 162 and serve to further stabilize the spindle 132 to ensure uniform concentric rotation. The spindle 132, the arbor 110, and related bearings are enclosed within a spindle sheath 158 that is situated within the sheath holding sphere 160. The sphere 160 is rotatable within a machining apparatus, such as the apparatus disclosed in the '809 patent until the machine head axis 116 and a spindle centering pilot 168 are aligned with the valve guide 172 of the valve seat 174.

A valve seat machining head 166 fits into a recessed area 176 in the tool holder spindle 132 and extends below the spindle sheath 158 and sheath holding sphere 160 along the machine head axis 116. Tool locking nuts 164 secure the machining head 166 to the tool holder spindle 132. The valve seat machining head 166 is centered on the machine head axis 116 at the distal end of the arbor 110 and includes the axial control rack 136, the carriage feed control rack 138, the pinion set for the tool holder carriage feed drive 140, 142, 144, 146, the tool holder carriage rack 148, the tool holder carriage 150, and the spindle centering pilot 168. A variety of cutting tools 152 required by machining specifications are attachable to the tool holder carriage 150.

The spindle assembly 100 of the second embodiment provides the means for a cutting tool 152 to make all the shapes necessary to manufacture and/or repair cylinder heads 170. Concave, convex, and vertical machining, such as any machining that is coaxial to and concentric with valve guides 172, are possible utilizing the independently controlled tool holder carriage 150. The second embodiment 100 of FIG. 10 can be utilized to machine valve seats 174 that are perfectly concentric with the axis of reference 116, i.e. the valve guide 172. Cylindrical machining is useful for a variety of fixtures including valve spring tappet housings, pre-combustion chamber housings, and valve spring pockets. This invention finds all of its utility when incorporated within a spindle having a spherical housing and movable sphere seat, i.e. small x,y axis adjustability, such as described in '809, '335, and '928 patents.

The method of machining a valve seat 174 of a cylinder head 170 of the second embodiment as shown in FIG. 10 includes the steps of rotating the spindle 14 utilizing a driving motor (not shown), feeding the tool holder carriage 150 outward or inward utilizing a carriage control mechanism 102 cooperating with the tool holder carriage feed rack 136, 138 and the associated pinion set 140, and vertically displacing the spindle assembly 100. The carriage control mechanism of the preferred method of the second embodiment is a stepper motor 102 and ball screw assembly 104, 108. Upon completion of the machining process, the universal cutting tool 152 is re-positionable to an initial position by operating the carriage control mechanism 102 to feed the carriage tool inward or outward to the initial position, or by controlling the carriage control mechanism 102 in combination with vertically displacing the spindle assembly 100.

We claim:

1. A method for lapping a valve seat of a plurality of pre-existing valve seats with corresponding valve guides in an engine cylinder head utilizing a spindle assembly in a machining apparatus, the spindle assembly having a spindle adapted for rotation around a vertical axis, the method comprising:

providing a carriage head at a lower portion of the spindle assembly, the carriage head having a carriage head control mechanism for effecting radial feed of the carriage head relative to the vertical axis;

attaching a universal cutting tool to the carriage head, the universal cutting tool having a single cutting point;

attaching a pilot at the lower portion of the spindle assembly so that the pilot is centered on the vertical axis, wherein the pilot is adapted to fit within a valve guide;

centering the spindle assembly with respect to the valve seat by inserting the pilot into the valve guide corresponding to the valve seat;

providing lapping parameters for a desired valve seat profile to a system controller, the desired valve seat profile comprising a plurality of segments, each segment having a segment length and at least one segment angle;

in the system controller, using the segment length and at least one segment angle for each of the plurality of segments to calculate each of a carriage head feed rate of the carriage head and a vertical feed rate and rotational speed of the spindle for lapping each segment of the valve seat profile using the lapping parameters; and separately for each segment of the desired valve seat profile, generating control signals in the system controller for controlling the vertical feed rate and the rotational speed of the spindle and controlling the carriage head feed rate independent of the vertical feed rate and the rotational speed.

2. The method of claim 1 wherein the step of controlling the vertical feed rate further comprises adjusting both the rotational speed and the vertical feed rate of the spindle for each segment of the desired valve seat profile.

3. The method of claim 2 wherein adjusting both the rotational speed and the vertical feed rate provides a circular interpolation capability.

4. The method of claim 1 wherein the step of providing machining parameters further comprises the step of reading a memory card having stored machining parameters using a memory card reader connected to the system controller.

5. The method of claim 1 wherein the step of controlling the vertical feed rate further comprises adjusting the vertical feed rate of the spindle while keeping the rotational speed of the spindle constant for each segment of the desired valve seat profile.

6. The method of claim 1 wherein the step of controlling the vertical feed rate further comprises adjusting the rotational speed of the spindle while keeping the vertical feed rate constant.

7. The method of claim 1 wherein the radial movement of the carriage head is outward from the vertical axis.

8. The method of claim 1, wherein the radial movement of the carriage head is inward toward the vertical axis.

9. The method of claim 1, wherein the at least one segment is curved and the system controller decomposes the curved segment into a plurality of straight lines.

10. The method of claim 1, wherein the carriage head has a plurality of mounting holes and the step of attaching the universal cutting tool comprises selecting a mounting hole according to a radius of the desired valve seat profile.

11. The method of claim 1, wherein the carriage head is disposed at an angle relative to a horizontal plane perpendicular to the vertical axis.

12. A method for lapping a valve seat in an engine cylinder head comprising:

determining a target valve seat profile, the target valve seat profile comprising a plurality of segments, each segment having a segment length and a segment angle;

providing a machine head having a spindle assembly adapted for rotation around a vertical axis and a carriage disposed at a lower portion of the spindle assembly at an inclination angle relative to a horizontal plane perpendicular to the vertical axis, the carriage adapted for radial movement relative to the vertical axis;

attaching a cutting tip to the carriage, the cutting tip having a single cutting point;

centering the vertical axis within the valve seat;

in a system controller, calculating a radial feed rate of the carriage and a vertical feed rate, a vertical displacement and a rotational speed of the spindle for creating each segment of the plurality of segments;

for each segment, generating control signals comprising a carriage control signal for moving the carriage at the calculated radial feed rate and a spindle control signal for moving the spindle assembly at the calculated vertical feed rate and the calculated rotational speed for the calculated vertical displacement; and lapping the plurality of segments one segment at a time to produce the target valve seat profile.

13. The method of claim 12, wherein the step of calculating comprises using the segment length and segment angle for calculating vertical feed rate per revolution of the spindle assembly, for calculating the number of spindle rotations, and for calculating an amount of vertical displacement of the spindle assembly, all for completion of the at least one segment.

14. The method of claim 13, wherein the step of calculating further comprises using the inclination angle of the carriage.

15. The method of claim 12, wherein the radial feed rate is independent of the vertical feed rate and the rotational speed.

16. The method of claim 12, wherein the step of generating control signals further comprises changing at least one of the radial feed rate, the vertical feed rate, and the rotational speed when proceeding from one segment to another segment in the valve seat profile.

17. The method of claim 12, wherein the step of centering comprises attaching a pilot to the lower portion of the spindle assembly along the vertical axis and inserting the pilot into a valve guide corresponding to the valve seat.

18. The method of claim 12 wherein the radial movement of the carriage head is outward from the vertical axis.

19. The method of claim 12, wherein the radial movement of the carriage head is inward toward the vertical axis.

20. The method of claim 12, wherein the at least one segment is curved and the step of calculating further comprises decomposing the curved segment into a plurality of straight lines.

21. The method of claim 12 further comprising the step of reading a memory card having stored machining parameters comprising the radial feed rate of the carriage and the vertical feed rate and the rotational speed of the spindle assembly for obtaining the target valve seat profile using a memory card reader connected to the system controller.

22. The method of claim 12, wherein the carriage has a plurality of mounting holes and the step of attaching the cutting tip comprises selecting a mounting hole according to a radius of the target valve seat profile.

* * * * *